(12) United States Patent
Houg

(10) Patent No.: US 7,328,503 B2
(45) Date of Patent: Feb. 12, 2008

(54) RECYCLING SYSTEM FOR ENGINE OIL FILTER

(76) Inventor: Wen-Cheng Houg, Giayi Hsien (TW)

(*) Notice: Subject to any disclaimer, the term of this patent is extended or adjusted under 35 U.S.C. 154(b) by 795 days.

(21) Appl. No.: 10/764,950

(22) Filed: Jan. 26, 2004

(65) Prior Publication Data

US 2005/0160590 A1 Jul. 28, 2005

(51) Int. Cl.
*B23P 19/00* (2006.01)
(52) U.S. Cl. .................. 29/801; 29/700; 29/403.3; 29/426.4; 29/426.1; 100/98 R; 100/131; 100/39
(58) Field of Classification Search .............. 29/403.3, 29/426.1, 426.4, 801, 700, 401.1; 100/39, 100/98 R, 131, 240
See application file for complete search history.

(56) References Cited

U.S. PATENT DOCUMENTS

| | | | | |
|---|---|---|---|---|
| 5,060,564 A | * | 10/1991 | Buford et al. ................. 100/52 |
| 5,136,934 A | * | 8/1992 | Darby, Jr. .................... 100/125 |
| 5,182,842 A | * | 2/1993 | Ross et al. ..................... 29/240 |
| 5,205,195 A | * | 4/1993 | Crosslen et al. ............... 82/92 |
| 5,243,754 A | * | 9/1993 | Tasch et al. .................. 29/801 |
| 5,245,739 A | * | 9/1993 | Ross et al. .................. 29/426.3 |
| 5,274,906 A | * | 1/1994 | ter Haar ....................... 29/700 |
| 5,297,332 A | * | 3/1994 | Ross et al. ..................... 29/801 |
| 5,297,479 A | * | 3/1994 | Negus ............................ 100/48 |
| 5,299,348 A | * | 4/1994 | Slack et al. ................. 29/403.3 |
| 5,325,771 A | * | 7/1994 | Morris .......................... 100/37 |
| 5,406,691 A | * | 4/1995 | Thorne ...................... 29/564.3 |
| 5,454,960 A | * | 10/1995 | Newsom ..................... 210/805 |
| 5,505,295 A | * | 4/1996 | Whittington ................ 206/223 |
| 5,890,424 A | * | 4/1999 | Deters .......................... 100/37 |
| 5,944,034 A | * | 8/1999 | McRae et al. ............. 134/25.4 |
| 6,584,665 B1 | * | 7/2003 | Sabesky ..................... 29/403.3 |
| 6,594,877 B2 | * | 7/2003 | Mori et al. ................. 29/403.1 |
| 6,722,023 B2 | * | 4/2004 | Mori et al. .................... 29/791 |
| 6,772,497 B2 | * | 8/2004 | Rice et al. ................. 29/426.4 |
| 7,162,786 B2 | * | 1/2007 | Rice et al. ................. 29/426.4 |
| 2007/0079738 A1 | * | 4/2007 | Broussard ................... 110/346 |

* cited by examiner

*Primary Examiner*—Essama Omgba
(74) *Attorney, Agent, or Firm*—Alan Kamrath; Kamrath & Associates PA

(57) ABSTRACT

A recycling system is used for processing an engine oil filter and comprises a frame, a filter net, a cutting device, a dividing device, and a compressing device. Thus, all of the parts of the used engine oil filter can be divided, processed and reused respectively, thereby efficiently achieving the resource recycling purpose, and thereby preventing the used engine oil filter from causing environmental pollution.

15 Claims, 7 Drawing Sheets

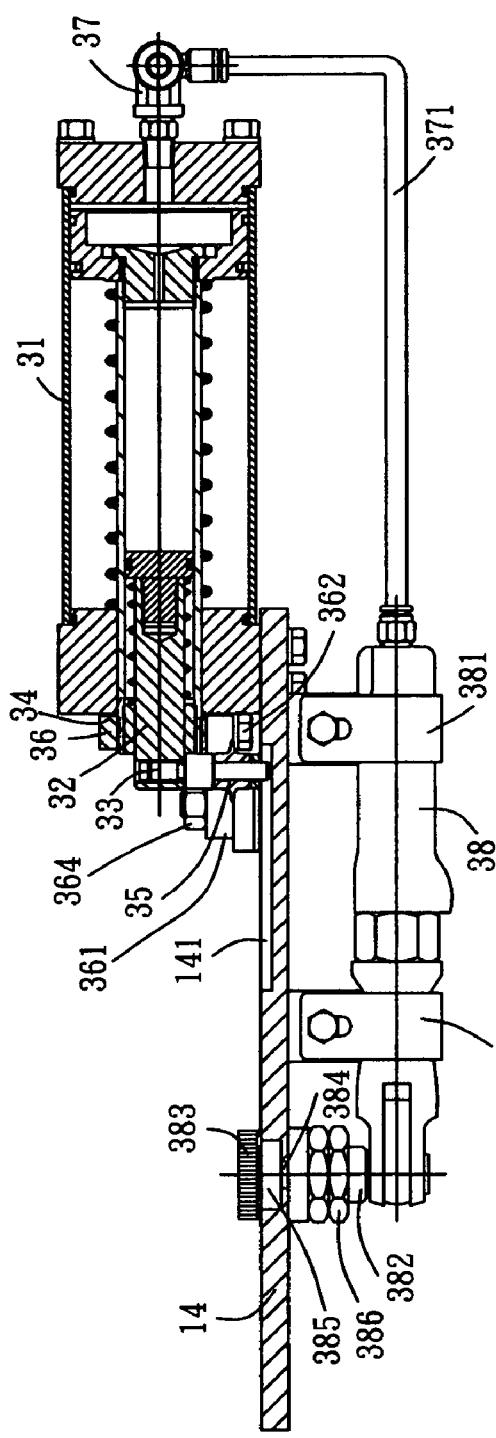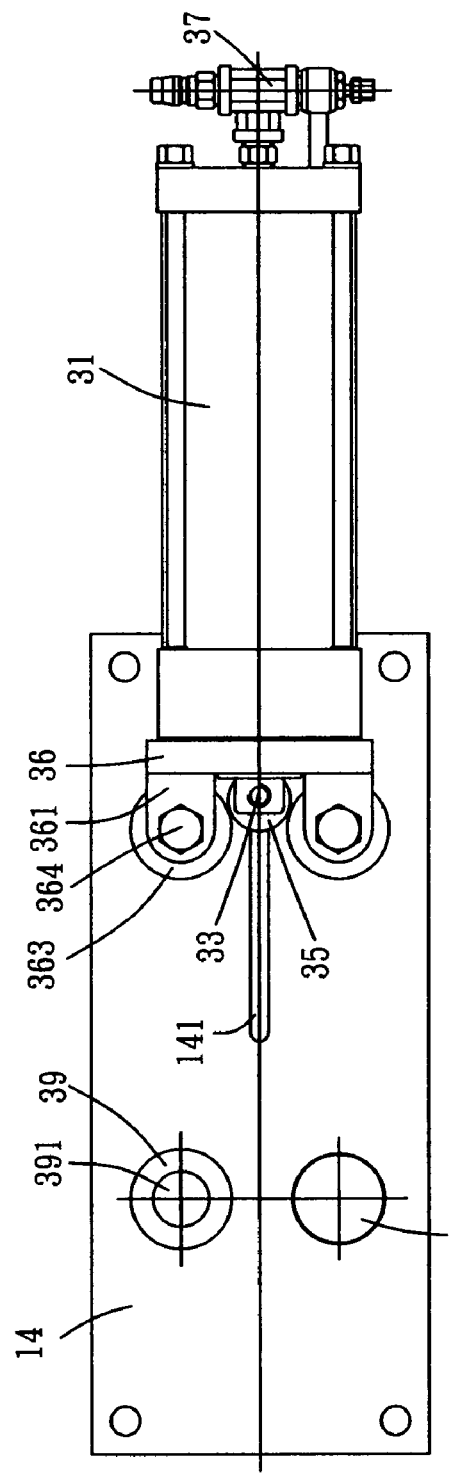

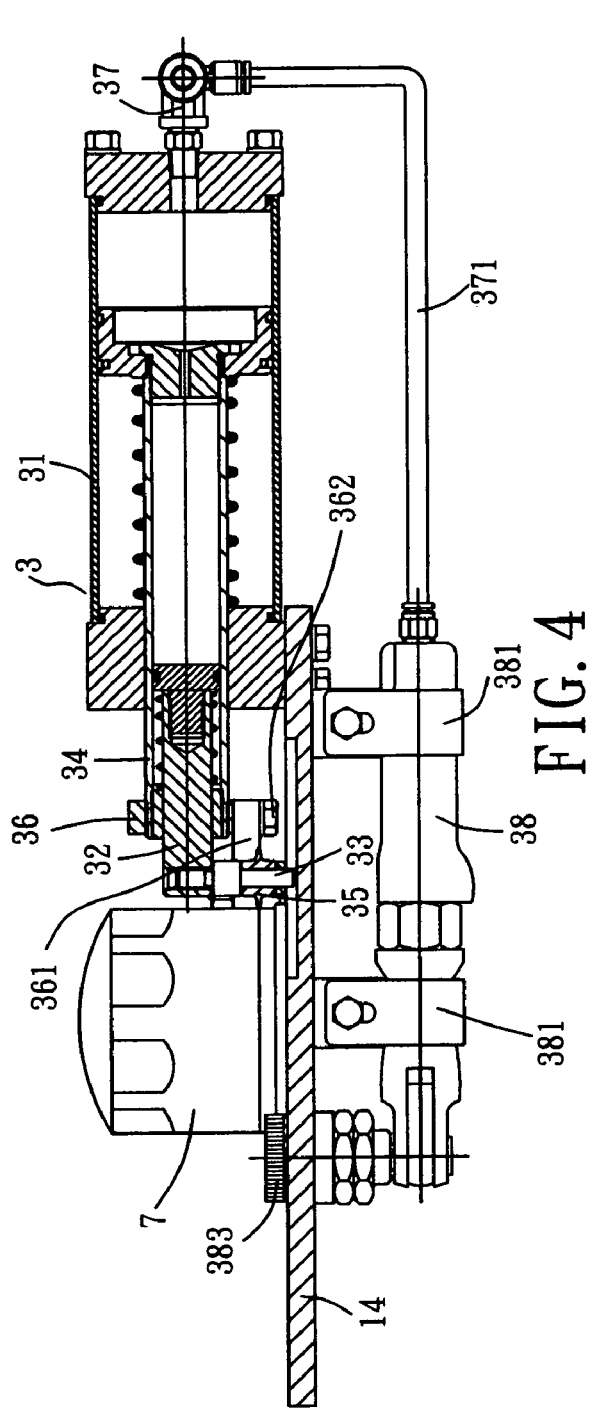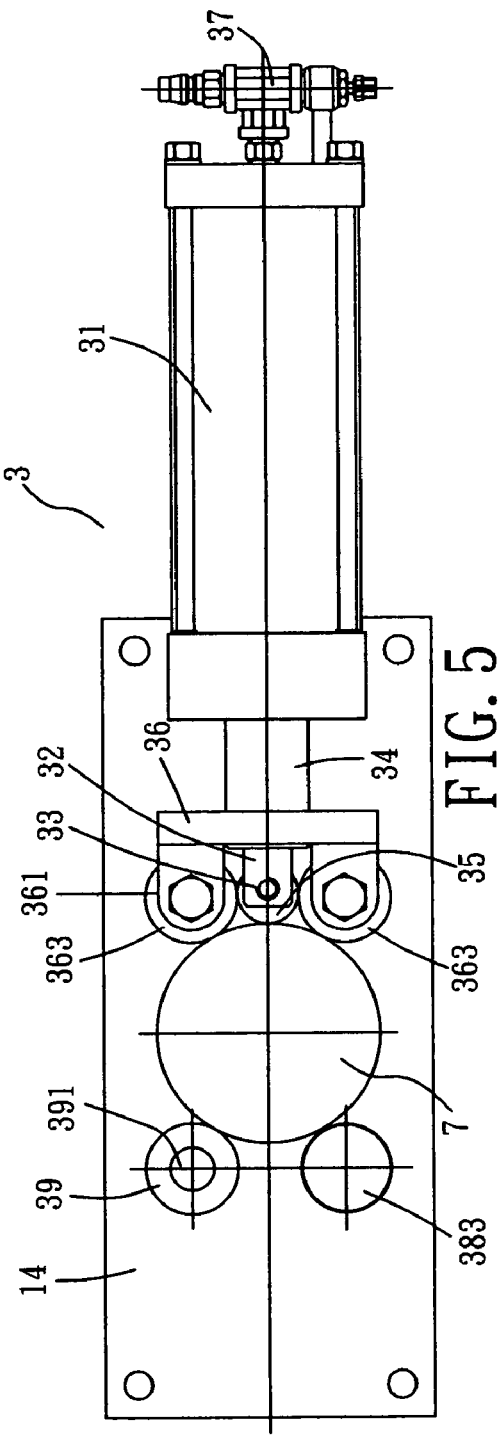
FIG. 4
FIG. 5

RECYCLING SYSTEM FOR ENGINE OIL FILTER

BACKGROUND OF THE INVENTION

1. Field of the Invention

The present invention relates to a recycling system, and more particularly to a recycling system for processing an engine oil filter, wherein all of the parts of the used engine oil filter can be divided, processed and reused respectively, thereby achieving the resource recycling purpose, and thereby preventing the used engine oil filter from causing environmental pollution.

2. Description of the Related Art

An engine oil filter that is used up is often placed on a collecting shelf so that the residual oil contained in the engine oil filter is dropped onto the collecting shelf. Then, the engine oil filter is thrown away. However, the parts contained in the used engine oil filter are not divided, processed and reused before being disposed, thereby greatly causing waste of the resource, and thereby easily causing environmental pollution.

SUMMARY OF THE INVENTION

The primary objective of the present invention is to provide a recycling system for processing an engine oil filter.

Another objective of the present invention is to provide a recycling system, wherein all of the parts of the used engine oil filter can be divided, processed and reused respectively, thereby efficiently achieving the resource recycling purpose, and thereby preventing the used engine oil filter from causing environmental pollution.

In accordance with the present invention, there is provided a recycling system, comprising:

a frame including a table and a base mounted on the table;

a substantially inverted U-shaped filter net mounted on the table of the frame;

a cutting device mounted on the table of the frame and including a composite pneumatic cylinder mounted on the base, a first piston rod movably mounted in the pneumatic cylinder, a push plate mounted on a distal end of the first piston rod to move therewith, a second piston rod movably mounted in the first piston rod and extended through the push plate, a connecting rod mounted on a distal end of the second piston rod to move therewith, and a disk cutter mounted on the connecting rod to move therewith;

a dividing device mounted on the table of the frame and includes a pneumatic cylinder mounted on the base, a piston rod movably mounted in the pneumatic cylinder, a push plate mounted on a distal end of the piston rod to move therewith, a plate-shaped cutter mounted on the push plate by a plurality of screw members to move therewith, and two holding rollers each rotatably mounted on the base of the frame by a screw member; and a compressing device mounted on the table of the frame and includes a box, a hydraulic cylinder mounted on a top plate of the box, a piston rod movably mounted in the hydraulic cylinder and having a distal end extended through the top plate of the box, and a compression disk mounted on the distal end of the piston rod to move therewith and movably mounted in the box.

Further benefits and advantages of the present invention will become apparent after a careful reading of the detailed description with appropriate reference to the accompanying drawings.

BRIEF DESCRIPTION OF THE DRAWINGS

FIG. 2 is a side plan cross-sectional view of the recycling system as shown in FIG. 1;

FIG. 3 is a top plan view of the recycling system as shown in FIG. 1;

FIG. 4 is a schematic operational view of the recycling system as shown in FIG. 2;

FIG. 5 is a schematic operational view of the recycling system as shown in FIG. 3;

DETAILED DESCRIPTION OF THE INVENTION

Figure 1:
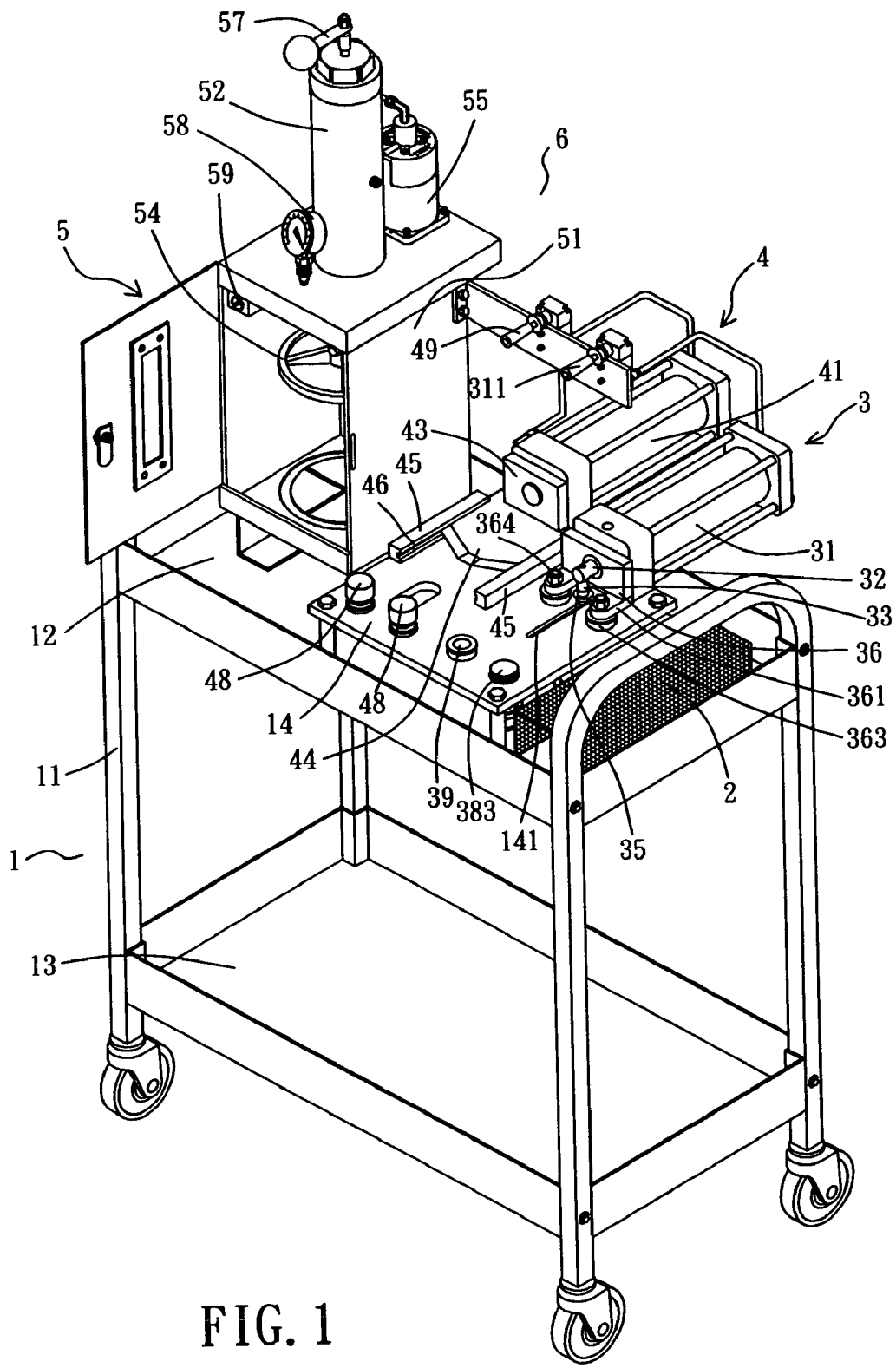
FIG. 1 is a perspective view of a recycling system in accordance with the preferred embodiment of the present invention.

Referring to the drawings and initially to FIG. 1, a recycling system 6 in accordance with the preferred embodiment of the present invention is used for processing an engine oil filter and comprises a frame 1, a filter net 2, a cutting device 3, a dividing device 4, and a compressing device 5.

The frame 1 includes a stand 11, a table 12 mounted on an upper portion of the stand 11, a base 14 mounted on the table 12, and a tray 13 mounted on a lower portion of the stand 11.

The filter net 2 is substantially inverted U-shaped and is mounted on the table 12 of the frame 1.

As shown in FIGS. 1-3, the cutting device 3 is mounted on the table 12 of the frame 1 and includes a composite pneumatic cylinder 31 mounted on the base 14, a first piston rod 34 movably mounted in the pneumatic cylinder 31, a push plate 36 mounted on a distal end of the first piston rod 34 to move therewith, two spaced extensions 361 each mounted on the push plate 36 by a screw member 362, two holding rollers 363 each rotatably mounted on a respective one of the extensions 361 by a connecting member 364, a second piston rod 32 movably mounted in the first piston rod 34 and extended through the push plate 36, a connecting rod 33 mounted on a distal end of the second piston rod 32 to move therewith, and a disk cutter 35 mounted on the connecting rod 33 to move therewith and located between the holding rollers 363. Preferably, the base 14 of the frame 1 is formed with a guide slot 141, and the connecting rod 33 of the cutting device 3 has a distal end slidably mounted in the guide slot 141 of the base 14.

In addition, the cutting device 3 further includes a gas connector 37 mounted in the pneumatic cylinder 31, a pipe 371 having a firs end mounted on the gas connector 37, a pneumatic wrench 38 mounted on the base 14 of the frame 1 by a plurality of support members 381 and having a first end mounted on a second end of the pipe 371 and a second end provided with a holding member 382, a drive rod 384 extended through the base 14 of the frame 1 and having a lower end mounted on and rotated by the holding member 382 of the pneumatic wrench 38, a gear 383 rotatably mounted on the base 14 of the frame 1 and mounted on a second end of the drive rod 384 to rotate therewith so that the gear 383 is driven to rotate by the holding member 382 of the pneumatic wrench 38, a roller 385 mounted in the base 14 of the frame 1 and mounted on the drive rod 384, and a plurality of nuts 386 mounted on the drive rod 384 and located between the base 14 of the frame 1 and the holding member 382 of the pneumatic wrench 38.

In addition, the cutting device 3 further includes a support roller 39 mounted on the base 14 of the frame 1 by a connecting member 391 and located beside the gear 383, and a control valve 311 connected to the pneumatic cylinder 31 to control movement of the disk cutter 35 and to control rotation of the gear 383.

Figure 6:
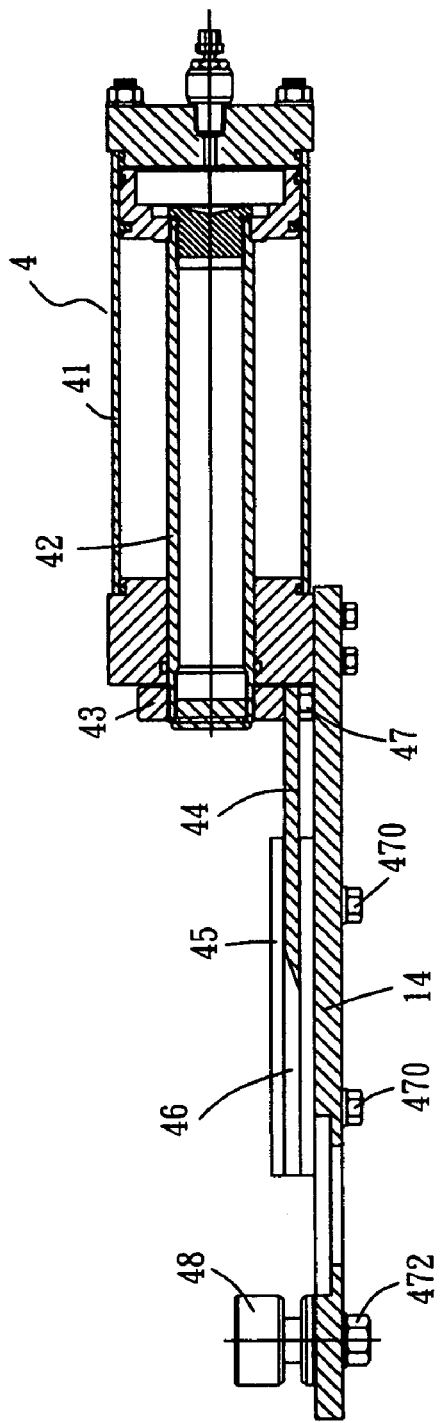
FIG. 6 is a side plan cross-sectional view of the recycling system as shown in FIG. 1.
Figure 7:
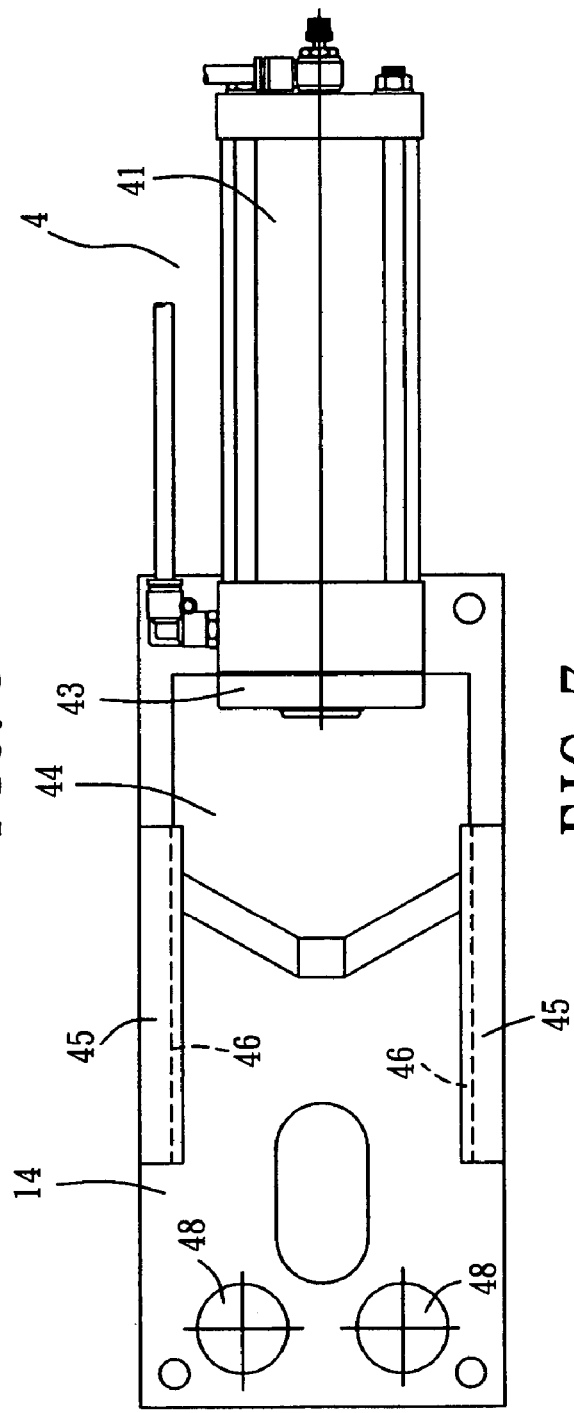
FIG. 7 is a top plan view of the recycling system as shown in FIG. 1.

As shown in FIGS. 1, 6, and 7, the dividing device 4 is mounted on the table 12 of the frame 1 and includes a pneumatic cylinder 41 mounted on the base 14, a piston rod 42 movably mounted in the pneumatic cylinder 41, a push plate 43 mounted on a distal end of the piston rod 42 to move therewith, a plate-shaped cutter 44 mounted on the push plate 43 by a plurality of screw members 47 to move therewith, and two holding rollers 48 each rotatably mounted on the base 14 of the frame 1 by a screw member 472.

In addition, the dividing device 4 further includes two guide tracks 45 each mounted on the base 14 of the frame 1 by a plurality of screw members 470 and each formed with a guide channel 46, and the cutter 44 of the dividing device 4 is movably mounted between the two guide tracks 45 and has two sides each slidably mounted in the guide channel 46.

In addition, the dividing device 4 further includes a control valve 49 connected to the pneumatic cylinder 41 to control movement of the cutter 44.

Figure 10:
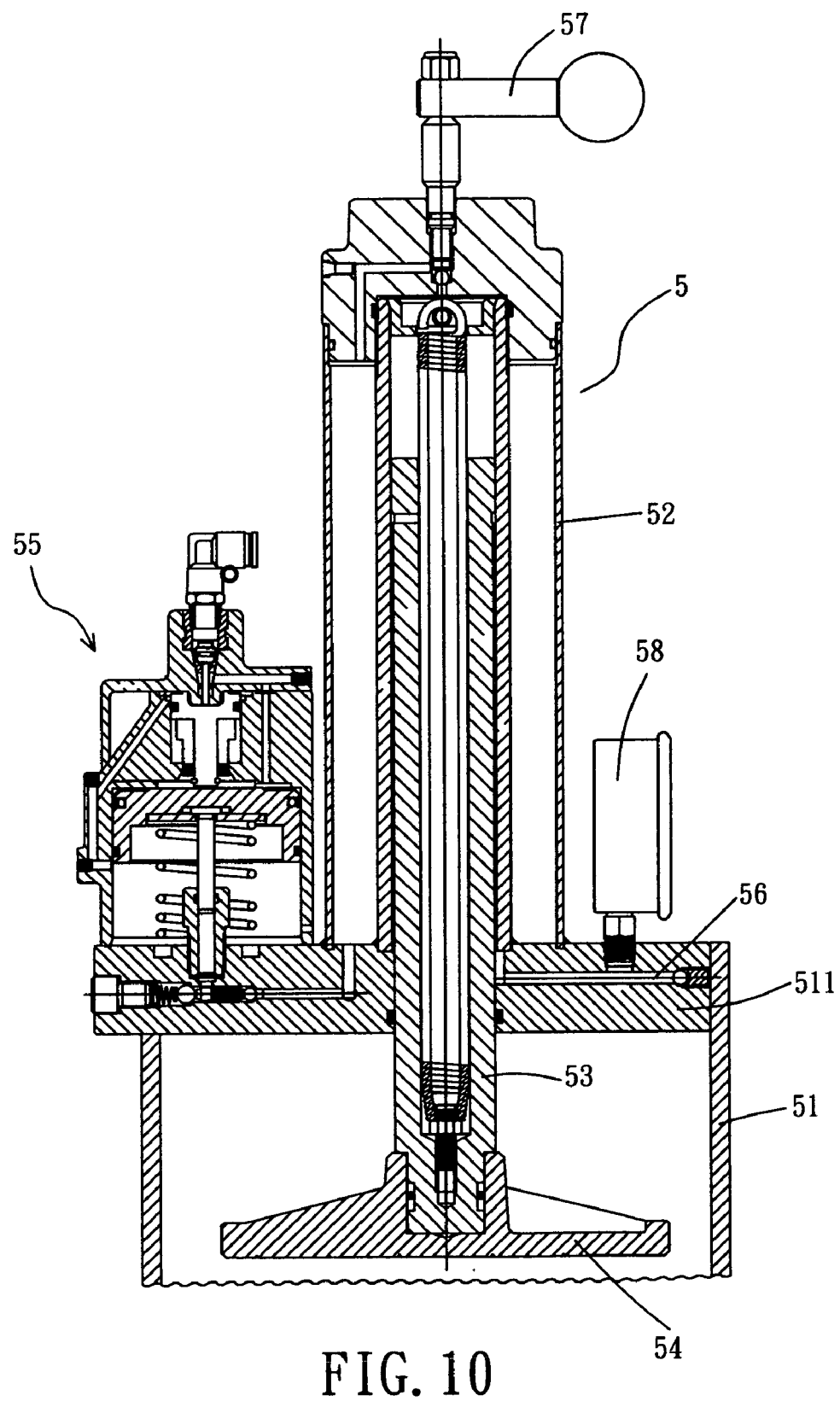
FIG. 10 is a side plan cross-sectional view of the recycling system as shown in FIG. 1.

As shown in FIGS. 1, and 10, the compressing device 5 is mounted on the table 12 of the frame 1 and includes a box 51, a hydraulic cylinder 52 mounted on a top plate 511 of the box 51, a piston rod 53 movably mounted in the hydraulic cylinder 52 and having a distal end extended through the top plate 511 of the box 51, a compression disk 54 mounted on the distal end of the piston rod 53 to move therewith and movably mounted in the box 51, a flow channel 56 formed in the top plate 511 of the box 51 and communicating with the hydraulic cylinder 52, a pneumatic pump 55 mounted on the top plate 511 of the box 51 and communicating with the flow channel 56, a pressure gauge 58 mounted on the top plate 511 of the box 51 and communicating with the flow channel 56 to indicate the pressure values of the hydraulic cylinder 52 when the piston rod 53 is moved downward to compress a can, a control valve 57 mounted on the hydraulic cylinder 52 to control the pneumatic pump 55 to drive the piston rod 53 to move in the hydraulic cylinder 52 reciprocatingly, and a safety switch 59 mounted on the box 51.

Figure 11:
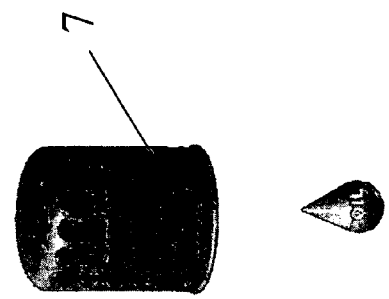
FIG. 11 is a perspective view of a used engine oil filter in accordance with the preferred embodiment of the present invention.

In operation, referring to FIGS. 11-15 with reference to FIGS. 1-10, a used engine oil filter 7 is placed on the filter net 2 to filter the residual oil contained in the engine oil filter 7 as shown in FIG. 11, and the residual oil contained in the engine oil filter 7 is then dropped onto the tray 13.

Figure 12:
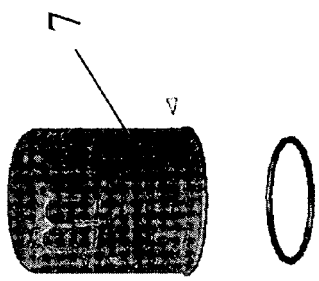
FIG. 12 is a partially exploded perspective view of the used engine oil filter as shown in FIG. 11.
Figures 13, 14, 15:
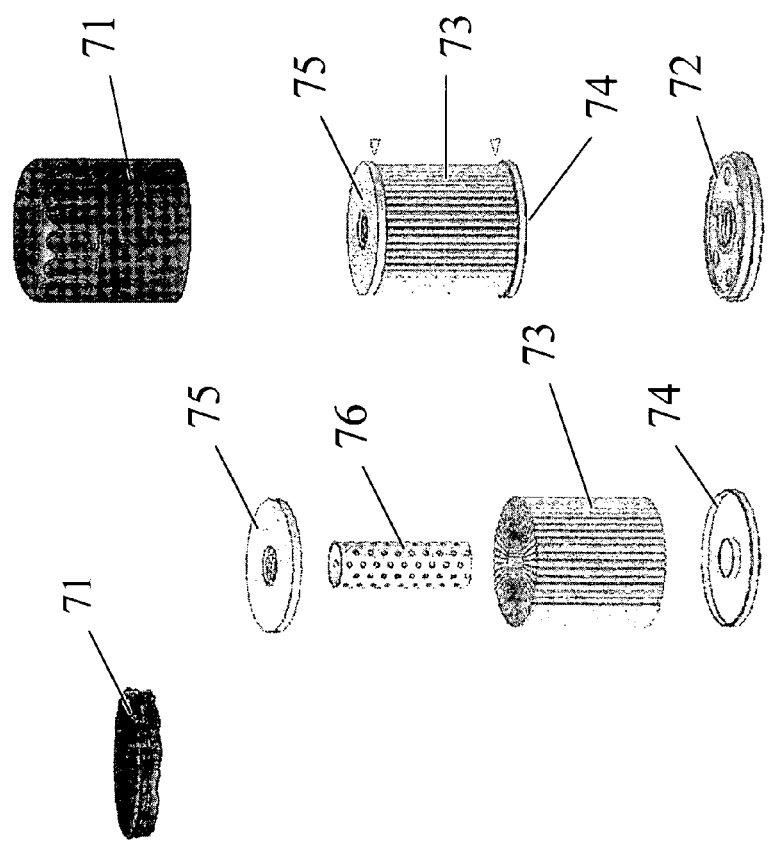
FIG. 13 is a partially exploded perspective view of the used engine oil filter as shown in FIG. 11.
FIG. 14 is a partially exploded perspective view of the used engine oil filter as shown in FIG. 11.
FIG. 15 is a perspective view showing a compressed can.

Then, the engine oil filter 7 is placed on the cutting device 3 and located between the holding rollers 363, the gear 383 and the support roller 39 as shown in FIG. 5. Then, the control valve 311 is started to control rotation of the gear 383, so that the engine oil filter 7 is rotated between the holding rollers 363, the gear 383 and the support roller 39. At the same time, by operation of the control valve 311, the second piston rod 32 is moved outward to move the disk cutter 35 toward the engine oil filter 7 so as to cut the engine oil filter 7 that is rotating as shown in FIGS. 4 and 5, thereby dividing the engine oil filter 7 into a can 71 and a bottom plate 72 as shown in FIGS. 12 and 13, so that a filter unit 73 is separated from the engine oil filter 7.

Figure 8:
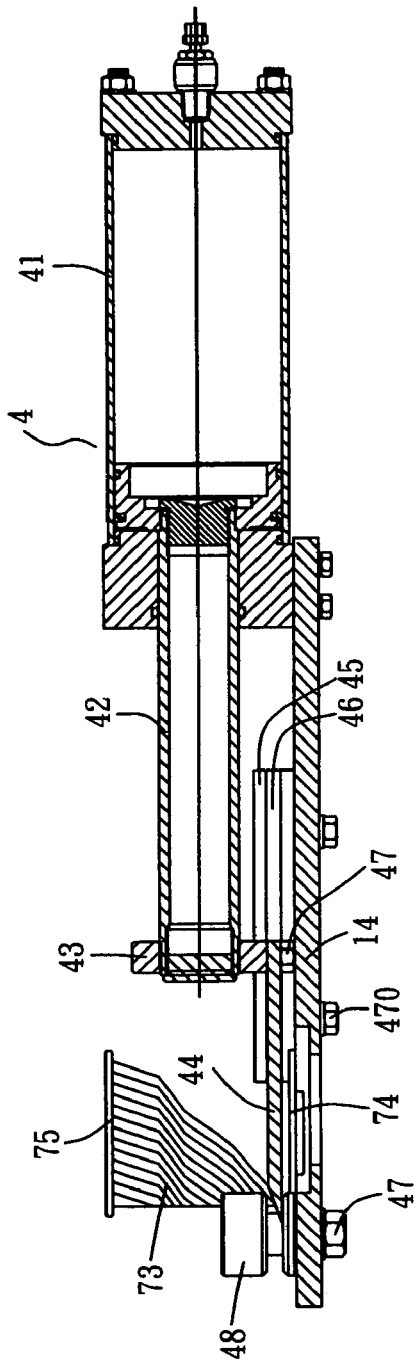
FIG. 8 is a schematic operational view of the recycling system as shown in FIG. 6.
Figure 9:
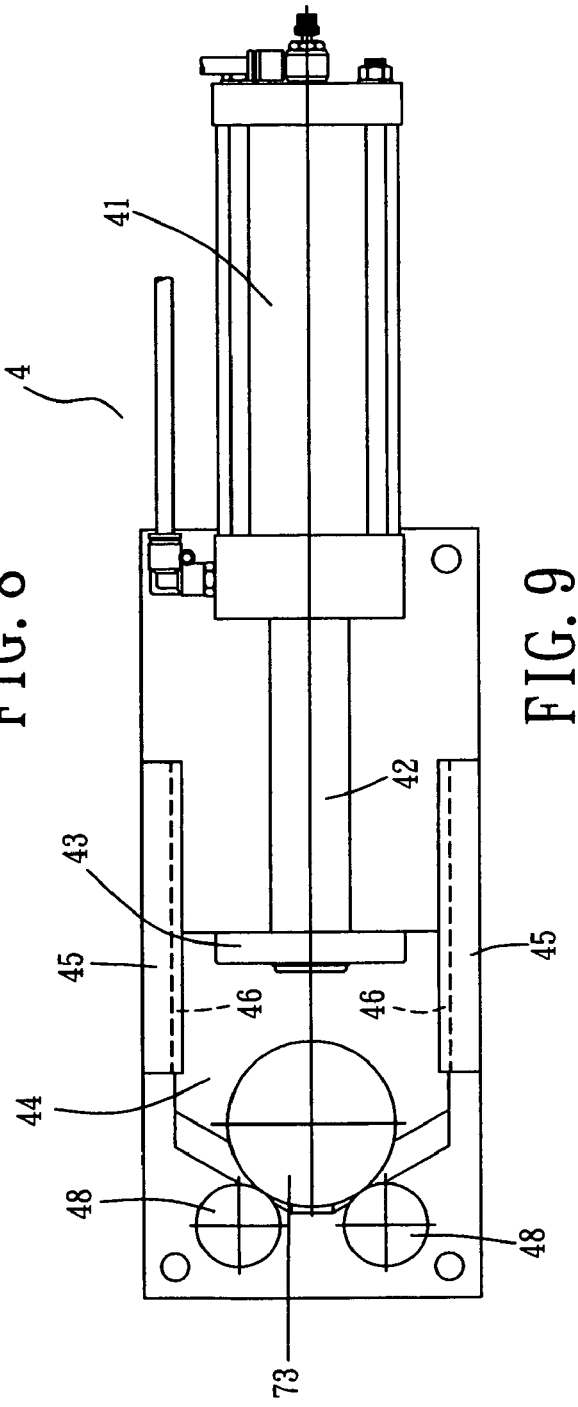
FIG. 9 is a schematic operational view of the recycling system as shown in FIG. 7.

Then, the filter unit 73 is placed on the dividing device 4 and located between the two holding rollers 48 and the cutter 44 as shown in FIG. 9. Then, the control valve 49 is started to drive the piston rod 42 to move outward to move the cutter 44 toward the filter unit 73 so as to cut the lower cover 74 of the filter unit 73 as shown in FIGS. 8 and 9. Similarly, the upper cover 75 of the filter unit 73 is cut in the same manner, thereby separating the upper cover 75 and the lower cover 74 from the filter unit 73, so that a filter net 76 is separated from the filter unit 73 as shown in FIG. 14.

Then, the can 71 is placed in the box 51 of the compressing device 5 and located under the compression disk 54. Then, the control valve 57 is started to control the pneumatic pump 55 to drive the piston rod 53 to move outward to move the compression disk 54 toward the can 71 so as to compress the can 71 as shown in FIG. 15. Finally, the compressed can 71, the bottom plate 72, the filter unit 73, the upper cover 75, the lower cover 74 and filter net 76 are collected and processed respectively.

Accordingly, all of the parts of the used engine oil filter 7 can be divided and reused respectively, thereby efficiently achieving the resource recycling purpose, and thereby preventing the used engine oil filter 7 from causing environmental pollution.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A recycling system, comprising:
    a frame including a table and a base mounted on the table; and
    a cutting device mounted on the table of the frame and including a first composite pneumatic cylinder mounted on the base, a first piston rod movably mounted in the first composite pneumatic cylinder, a first push plate mounted on a distal end of the first piston rod to move therewith, a second piston rod movably mounted in the first piston rod and extending through the first push plate, a connecting rod mounted on a distal end of the second piston rod to move therewith, and a disk cutter mounted on the connecting rod to move therewith.

2. The recycling system in accordance with claim 1, wherein the frame further includes a stand, wherein the table is mounted on an upper portion of the stand.

3. The recycling system in accordance with claim 2, wherein the frame further includes a tray mounted on a lower portion of the stand.

4. The recycling system in accordance with claim 1, further comprising a substantially inverted U-shaped filter net mounted on the table of the frame.

5. The recycling system in accordance with claim 1, wherein the base of the frame is formed with a guide slot, and the connecting rod of the cutting device has a distal end slidably mounted in the guide slot of the base.

6. The recycling system in accordance with claim 1, wherein the cutting device further includes two spaced extensions each mounted on the first push plate by a screw member, and two holding rollers each rotatably mounted on a respective one of the two spaced extensions by a connecting member.

7. The recycling system in accordance with claim 6, wherein the disk cutter is located between the two holding rollers.

8. The recycling system in accordance with claim 1, wherein the cutting device further includes a gas connector mounted in the first composite pneumatic cylinder, a pipe having a first end mounted on the gas connector, a pneumatic wrench mounted on the base of the frame by a plurality of support members and having a first end mounted on a second end of the pipe and a second end provided with a holding member, a drive rod extending through the base of the frame and having a first lower end mounted on and rotated by the holding member of the pneumatic wrench, a gear rotatably mounted on the base of the frame and mounted on a second end of the drive rod to rotate therewith so that the gear is driven to rotate by the holding member of the pneumatic wrench.

9. The recycling system in accordance with claim 8, wherein the cutting device further includes a roller mounted in the base of the frame and mounted on the drive rod, and a plurality of nuts mounted on the drive rod and located between the base of the frame and the holding member of the pneumatic wrench.

10. The recycling system in accordance with claim 8, wherein the cutting device further includes a support roller mounted on the base of the frame by a connecting member and located beside the gear, and a control valve connected to the first composite pneumatic cylinder to control movement of the disk cutter and to control rotation of the gear.

11. The recycling system in accordance with claim 1, further comprising a dividing device mounted on the table of the frame and including a second composite pneumatic cylinder mounted on the base, a third piston rod movably mounted in the second composite pneumatic cylinder, a second push plate mounted on a distal end of the third piston rod to move therewith, a plate-shaped cutter mounted on the second push plate by a plurality of screw members to move therewith, and two holding rollers each rotatably mounted on the base of the frame by a screw member.

12. The recycling system in accordance with claim 11, wherein the dividing device further includes two guide tracks each mounted on the base of the frame by a plurality of screw members and each formed with a guide channel, and the plate-shaped cutter of the dividing device is movably mounted between the two guide tracks and has two sides each slidably mounted in the guide channel.

13. The recycling system in accordance with claim 11, wherein the dividing device further includes a control valve connected to the second composite pneumatic cylinder to control movement of the plate-shaped cutter.

14. The recycling system in accordance with claim 1, further comprising a compressing device mounted on the table of the frame and including a box, a hydraulic cylinder mounted on a top plate of the box, a piston rod of the hydraulic cylinder movably mounted in the hydraulic cylinder and having a distal end extended through the top plate of the box, and a compression disk mounted on the distal end of the piston rod of the hydraulic cylinder to move therewith and movably mounted in the box.

15. The recycling system in accordance with claim 14, wherein the compressing device further includes a flow channel formed in the top plate of the box and communicating with the hydraulic cylinder, a pneumatic pump mounted on the top plate of the box and communicating with the flow channel, a pressure gauge mounted on the top plate of the box and communicating with the flow channel to indicate pressure values of the hydraulic cylinder when the piston rod of the hydraulic cylinder is moved downward to compress a can, a control valve mounted on the hydraulic cylinder to control the pneumatic pump to drive the piston rod of the hydraulic cylinder to move in the hydraulic cylinder reciprocatingly, and a safety switch mounted on the box.

* * * * *